(12) United States Patent
Cho

(10) Patent No.: US 9,119,228 B2
(45) Date of Patent: Aug. 25, 2015

(54) STEERING WHEEL INCLUDING HEATING ELEMENT

(71) Applicant: Hwajin Co., Ltd., Gyeongsangbuk-do (KR)

(72) Inventor: Man Ho Cho, Gyeonggi-do (KR)

(73) Assignee: Hwajin Co., Ltd. (KR)

( * ) Notice: Subject to any disclaimer, the term of this patent is extended or adjusted under 35 U.S.C. 154(b) by 322 days.

(21) Appl. No.: 13/865,822

(22) Filed: Apr. 18, 2013

(65) Prior Publication Data

US 2013/0228561 A1 Sep. 5, 2013

Related U.S. Application Data

(63) Continuation of application No. PCT/KR2011/002811, filed on Apr. 20, 2011.

(30) Foreign Application Priority Data

Oct. 20, 2010 (KR) .......................... 10-2010-0102513

(51) Int. Cl.
*B60L 1/02* (2006.01)
*H05B 1/00* (2006.01)
*B62D 1/06* (2006.01)
*H05B 3/36* (2006.01)

(52) U.S. Cl.
CPC ........ *H05B 1/00* (2013.01); *B62D 1/065* (2013.01); *H05B 3/36* (2013.01); *H05B 2203/014* (2013.01)

(58) Field of Classification Search
CPC ............ B62D 1/00; B62D 1/065; H05B 3/34; H05B 3/36; H05B 2203/003; H05B 2203/017; H05B 2203/033; H05B 2203/014; Y10T 74/20834
See application file for complete search history.

(56) References Cited

U.S. PATENT DOCUMENTS

| 1,386,582 | A | 4/1926 | Steuart et al. |
| 2,392,539 | A | 1/1946 | Leible |
| 6,392,195 | B1 | 5/2002 | Zhao et al. |
| 2003/0218004 | A1 | 11/2003 | Yoneyama et al. |

FOREIGN PATENT DOCUMENTS

| CN | 1453172 A | 11/2003 |
| CN | 101028829 A | 9/2007 |
| DE | 200 01 812 U1 | 7/2001 |

(Continued)

OTHER PUBLICATIONS

Office Action, and partial translation thereof, in corresponding Japanese Application No. 2013-534794, dated Jan. 31, 2014, 4 pages.

(Continued)

*Primary Examiner* — Shawntina Fuqua
(74) *Attorney, Agent, or Firm* — Brinks Gilson & Lione

(57) ABSTRACT

Provided is a steering wheel having a heating element, wherein a surface of the heating element can be finished by directly transferring thereon a transfer film on which an aesthetic decoration pattern is printed. The heating element is an electrical conductive paste coated on a surface of a rim, and includes a plurality of heating lines that are electrically separated from each other, and a connection unit that electrically short-circuits the heating lines at both ends thereof, and power is supplied to the heating element through the connection unit.

20 Claims, 20 Drawing Sheets

(56) References Cited

FOREIGN PATENT DOCUMENTS

| | | |
|---|---|---|
| JP | 3-174796 A | 7/1991 |
| JP | 2002-96738 A | 4/2002 |
| JP | 2004-058864 A | 2/2004 |
| JP | 2007-290685 A | 11/2007 |
| JP | 2007-324426 A | 12/2007 |
| JP | 2008-10354 A | 1/2008 |
| JP | 2008-114680 A | 5/2008 |
| JP | 2011-514647 A | 5/2011 |
| KR | 20-1991-0011426 | 7/1991 |
| KR | 10-1992-0019598 | 11/1992 |
| KR | 20-1998-0002418 | 3/1998 |
| KR | 20-1998-0053031 | 10/1998 |
| KR | 10-2003-0018737 A | 3/2003 |
| KR | 2003-0066573 | 8/2003 |
| KR | 20-0331802 Y1 | 10/2003 |
| KR | 20-0425039 Y1 | 8/2006 |
| KR | 10-2006-0112926 A | 11/2006 |
| KR | 20-2010-0008712 U | 9/2010 |
| WO | WO 2009/116787 A2 | 9/2009 |

OTHER PUBLICATIONS

Extended European Search Report in corresponding European Application No. 11834509.9, dated Feb. 26, 2014, 5 pages.

Notice of Allowance dated Jan. 31, 2011 of Korean Patent Application No. 10-2010-0102513 (2 pages).

International Search Report and Written Opinion dated Dec. 22, 2011 of PCT Application No. PCT/KR2011/002811 (7 pages).

Office Action issued in Chinese Patent Application No. 201180050322.1, mailed Feb. 4, 2015, 8 pgs., including English translation.

STEERING WHEEL INCLUDING HEATING ELEMENT

PRIORITY

This application is a continuation of Patent Cooperation Treaty (PCT) international application Serial No. PCT/KR2011/002811, filed on Apr. 20, 2011 and which designates the United States, which claims priority to Korean Patent Application No. 10-2010-0102513, filed on Oct. 20, 2010. The entirety of both Patent Cooperation Treaty (PCT) international application Serial No. PCT/KR2011/002811 and Korean Patent Application No. 10-2010-0102513 are hereby incorporated by reference herein.

BACKGROUND OF THE INVENTION

1. Technical Field

The present invention relates to a steering wheel including a heating element, and more particularly, to a steering wheel including a heating element which may minimize a temperature difference felt by a driver when grasping the wheel by heating the entire surface of a rim of the steering wheel to a uniform temperature.

Also, the present invention relates to a steering wheel including a heating element which may continuously generate heat even though a portion of the heating element is cracked or electrically disconnected, minimize an increase in a diameter of the steering wheel in spite of use of the heating element, and directly transfer a transfer film on which an aesthetic decoration pattern such as a wood pattern is printed onto a surface of the heating element.

2. Background Art

A steering wheel is a driver-manipulated element of a steering system of a vehicle. In this regard, many studies have been conducted to improve its aesthetic appearance, convenience of holding, use of functional elements therewith, etc.

In particular, when starting to drive a vehicle in winter, the temperature of a steering wheel is lower than that of the human body, which affects the driver and might pose a safety-related problem.

Accordingly, various apparatuses for heating a steering wheel to a temperature greater than that of the human body have been studied.

In a conventional technique for heating a steering wheel as disclosed in Korean Utility Model Application No. 1989-0020599, Korean Patent Application No. 1.992-0000945, and Korean Utility Model Application No. 1996-16958, heating coils 3 are buried in a rim portion 10 of a steering wheel as shown in FIG. 1.

In order to bury the heating coils 3, as shown in FIG. 2, an insulating covering material 2 is coated around a core 1 and the heating coils 3 are bonded to an outer circumferential surface of the insulating covering material 2. Afterwards, a surface of the rim portion 10 is finished using a finishing member 4 such as a synthetic resin.

In another method of burying the heating coils 3, as disclosed in Korean Utility Model Registration Application No. 1996-066213 (FIG. 3), after winding a heating wire 5 in a coil shape on an outer circumferential surface of the core 1, a surface of the heating wire 5 is finished by using a synthetic resin mold 6.

However, as shown in FIG. 2, when the heating coils 3 are fixed around the outer circumferential surface of the insulating covering material 2, it is quite difficult to arrange the thin heating coils 3 at uniform intervals, and a temperature difference between areas in the rim portion 10 occurs in practice due to irregular distances between the heating coils 3.

Also, as shown in FIG. 3, when the heating wire 5 is wound in a coil shape, a temperature difference may also occur due to irregular winding gaps, and, in particular, since only one heating wire 5 is wound, when the heating wire 5 breaks during a working process, it is necessary to replace and re-wind the entire heating wire 5 again.

Also, when the heating coils 3 or the heating wire 5 is buried as described above, it takes a certain period of time for heat to be transferred from the heating coils 3 or the heating wire 5 to a surface of the rim portion 10.

A plane heater 14 for a steering wheel is disclosed in Japanese Patent Laid-Open Application No. 2007-290685 (FIG. 4). In the plane heater 14, heating wires 17 are fixed to a supporter 16 formed of a nonwoven material. FIG. 5 is a photograph of an actual plane heater 14, and FIG. 6 is a photograph showing a steering wheel including the plane heater 14. As shown in FIG. 6, the plane heater 14 is mounted on an outer circumference of a rim of the steering wheel.

The plane heater 14 provides a cushioning effect when a driver holds the steering wheel since the supporter 16 of the plane heater 14 is formed of a nonwoven material. However, when the plane heater 14 is used, a thickness (diameter) of the steering wheel is increased due to the supporter 16 formed of a nonwoven material. Also, the steering wheel is finished by covering an actual wood 20 or a leather to protect the plane heater 14 and to gentrify a decoration. In this case, a thickness of the steering wheel is further increased.

The Cubic Printing (Curl-fit) method for a rim of a steering wheel of a vehicle disclosed in Korean Patent Registration No. 10-0472399 of the current inventor may not be applied to the plane heater 14 having a rough surface as described above. That is, a transfer film, on which a wood pattern for an aesthetic decoration of the steering wheel is printed, may not be directly transferred onto the rough surface of the plane heater 14. For a decoration of the steering wheel, as shown in FIG. 6, after processing a wood piece 20, the processed wood piece 20 must be applied to the plane heater 14 (after processing two pieces of woods having a semi-circle shape, the two pieces of woods are joined to surround the surface of the plane heater 14). In this case, the manufacture of the steering wheel is time-consuming, and thus, expensive. Also, due to the low thermal conductivity of the wood piece 20, the overall thermal conductivity of the steering wheel is reduced, and accordingly, heat of the plane heater 14 may not be efficiently utilized.

SUMMARY OF THE INVENTION

The present invention provides a steering wheel including a heating element which may minimize a temperature difference felt by a driver when grasping the steering wheel by heating the entire surface of a rim of the steering wheel to a uniform temperature.

First, according to the steering wheel of the present invention, since a conductive paste is formed as a heating element into a predetermined pattern on a surface of a rim and an electrical resistance of the predetermined pattern decreases away from an inner diameter portion of the rim toward an outer diameter portion of the rim, a temperature difference at the surface of the rim may be lower than that in a conventional steering wheel.

Second, according to the steering wheel of the present invention, since a heating element includes a plurality of heating lines, even though some of the heating lines are electrically disconnected, heat may be continuously generated from remaining heating lines.

Third, according to the steering wheel of the present invention, since a conductive paste is formed as a heating element on a surface of a rim, a driver may feel a sense of soft touch when holding the rim with his/her hands.

Fourth, according to the steering wheel of the present invention, since a conductive paste is coated and formed as a heating element on a surface of a rim, a transfer film, on which a decoration pattern is printed, may be transferred onto a surface of the heating element. Accordingly, heat loss of the heating element may be minimized and a thickness (diameter) of the rim may be smaller than that in a conventional steering wheel, thereby making it possible for a driver to stably hold the rim.

According to an aspect of the present invention, a steering wheel is provided, the steering wheel comprising: a rim, and a heating element disposed over the rim, the heating element comprising: a plurality of heating lines, and an electrically conductive paste coated over the plurality of heating lines, wherein a thickness of the electrically conductive paste is configured to change from an inner portion of the rim towards an outer portion of the rim based on a resistive characteristic of the heating element.

According to another aspect of the present invention, a method for heating a steering wheel is provided, the method comprising: depositing a plurality of heating lines on a rim of the steering wheel; coating the plurality of heating lines on the rim with an electrically conductive paste such that a thickness of the electrically conductive paste changes from an inner portion of the rim towards an outer portion of the rim based on a resistive characteristic of the heating lines, and supplying power to the plurality of heating lines.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
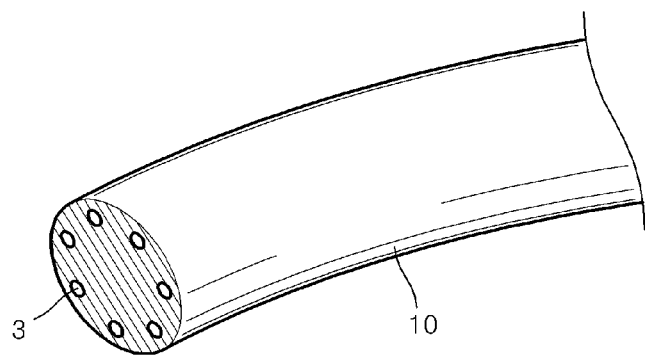
FIGS. 1 and 2 are schematic views illustrating a steering wheel including a conventional heating element.
Figure 2:
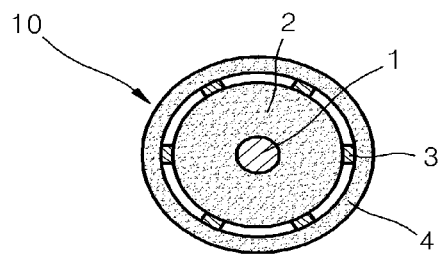
Figure 3:
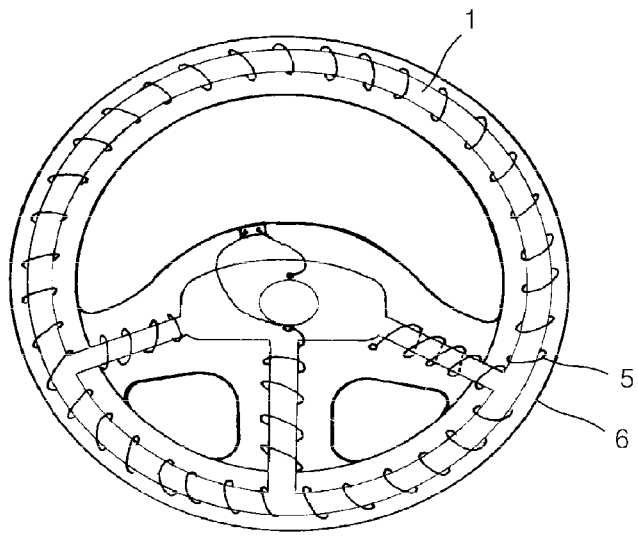
FIG. 3 is a schematic view illustrating a steering wheel including another conventional heating element.
Figure 4:
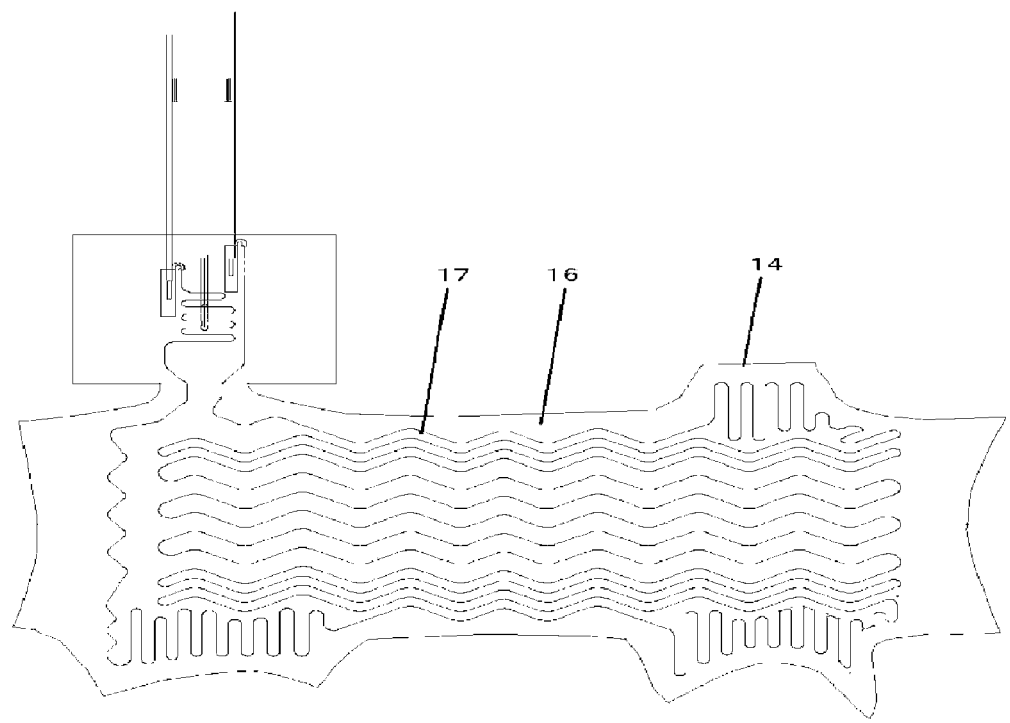
FIG. 4 is a schematic view illustrating a plane heater as a conventional heating element.
Figure 5:
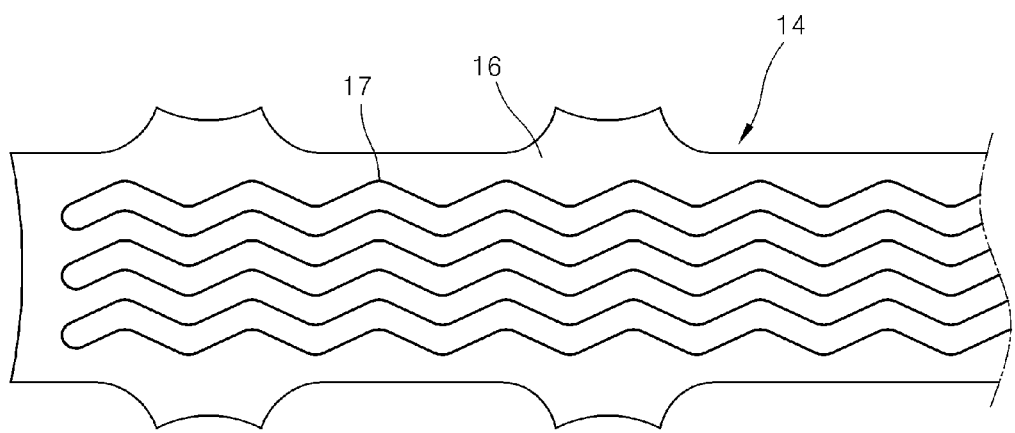
FIG. 5 is a photograph illustrating the plane heater of FIG. 4.
Figure 6:
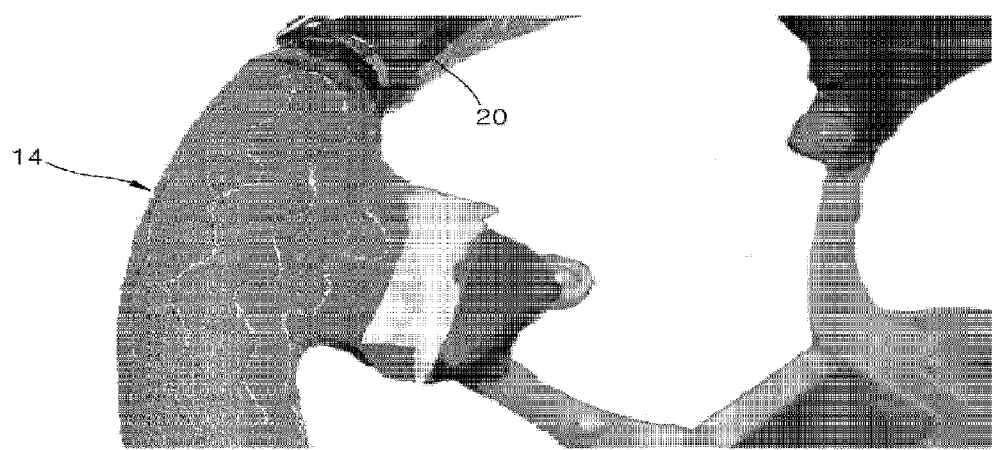
FIG. 6 is a photograph of a steering wheel on which the plane heater of FIG. 5 is mounted.

The present invention as described herein may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein.

The present invention provides a steering wheel including a heating element which may minimize a temperature difference felt by a driver when grasping the steering wheel by heating the entire surface of a rim of the steering wheel to a uniform temperature.

The present invention also provides a steering wheel including a heating element which may continuously generate heat in other portions even though a portion of the heating element is electrically disconnected.

The present invention also provides a steering wheel including a heating element which may transfer a transfer film on which a decoration pattern is printed onto a surface of the heating element.

According to an aspect of the present invention, there is provided a steering wheel including a rim, and a heating element including a plurality of heating lines and being heated by power supplied thereto, wherein the heating element is an electrically conductive paste and is coated on a surface of the rim, wherein if the heating lines of the heating element are electrically connected in series, the heating element is formed such that an electrical resistance per unit area increases away from an inner diameter portion toward an outer diameter portion of the rim, and if the heating lines of the heating element are electrically connected in parallel, the heating element is formed such that an electrical resistance per unit area decreases away from the inner diameter portion toward the outer diameter portion of the rim.

The heating element may include a plurality of first heating lines which are coated from the inner diameter portion to the outer diameter portion of the rim, and a plurality of second heating lines which are coated from the inner diameter portion to the outer diameter portion of the rim across the first heating lines, wherein the first heating lines and the second heating lines are coated such that an electrical resistance per unit area decreases away from the inner diameter portion toward the outer diameter portion of the rim.

The first heating lines and the second heating lines may be coated such that a coating thickness of a conductive paste increases away from the inner diameter portion toward the outer diameter portion of the rim.

The first heating lines and the second heating lines may be coated such that a coating width of a conductive paste increases away from the inner diameter portion toward the outer diameter portion of the rim.

The steering wheel may further include third heating line coated on the inner diameter portion of the rim to connect the first heating lines and the second heating lines, and fourth heating line further coated on the outer diameter portion to connect the first heating lines and the second heating lines.

The steering wheel may further include fifth heating line coated in parallel to the fourth heating line between a top portion of the rim and the fourth heating line.

The steering wheel may further include a decoration pattern layer formed by transferring a transfer film on which a decoration pattern is printed onto a surface of the heating element.

The steering wheel may further include a base layer formed between the heating element and the decoration pattern layer.

A steering wheel according to the present invention may enable a driver to drive a vehicle without any temperature discomfort in winter by employing a heating element and heating a rim of a steering wheel to a temperature higher than that of the human body, and particularly, enable the driver to comfortably hold a the steering wheel by heating an entire surface of the rim to a uniform temperature.

Also, the steering wheel may directly transfer a transfer film having a decoration pattern layer onto a surface of the heating element, adopt an aesthetic decoration pattern layer such as a wood pattern, and provide a sense of soft touch when the driver holds the rim.

Also, the steering wheel may stably generate heat even though a portion of the heating element is electrically disconnected.

Figure 7:
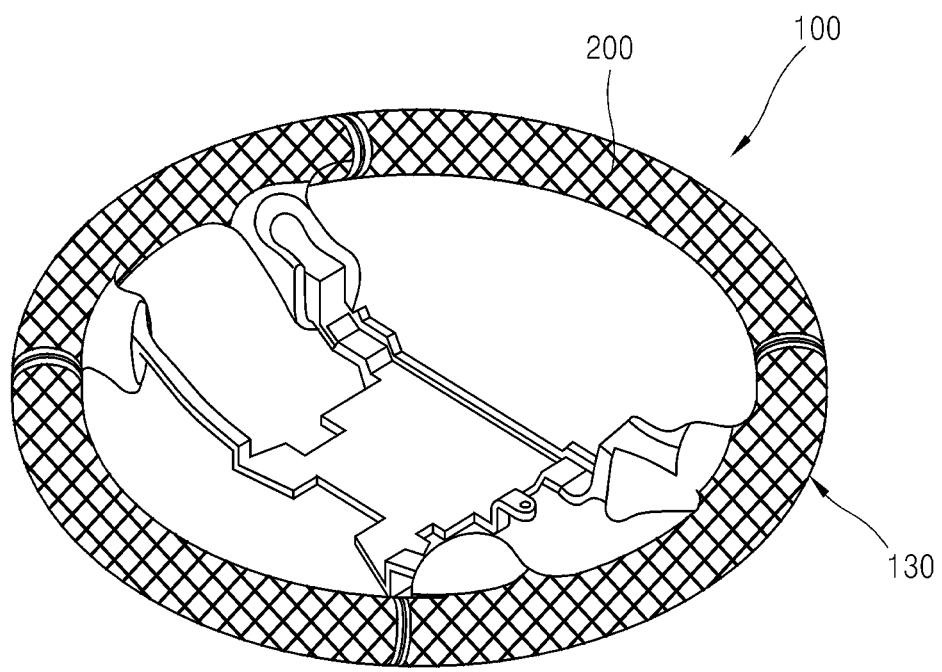
FIG. 7 is a photograph of a steering wheel including a heating element according to an embodiment of the present invention.
Figure 8:
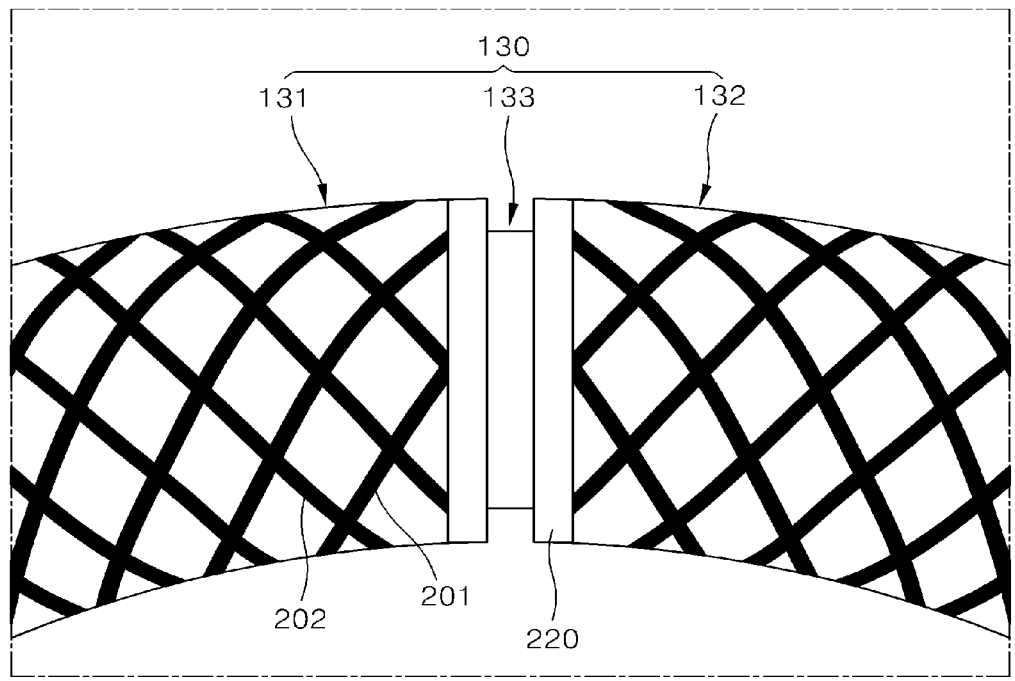
FIG. 8 is a photograph illustrating essential parts of the steering wheel of FIG. 7.
Figure 9:
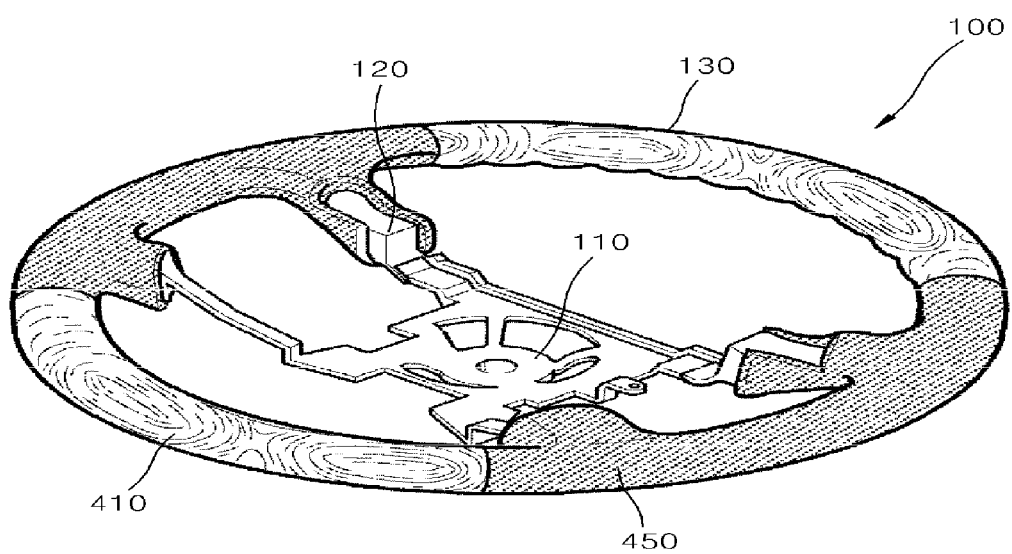
FIG. 9 is a perspective view illustrating a state where a transfer film and a leather are employed in a steering wheel on which a conductive paste is coated as the heating element.

FIG. 7 is a photograph of a steering wheel 100 according to an embodiment of the present invention, in which a heating element 200 is coated on a surface of a rim 130. FIG. 8 is an enlarged photograph illustrating essential parts of the steering wheel 100 of FIG. 7. FIG. 9 is a perspective view illustrating a state where a decoration pattern layer 410 is formed on a portion of the rim 130 on which the heating element 200 is coated as shown in FIG. 7 and a leather 450 is coupled to remaining portions of the rim 130.

Figure 15:
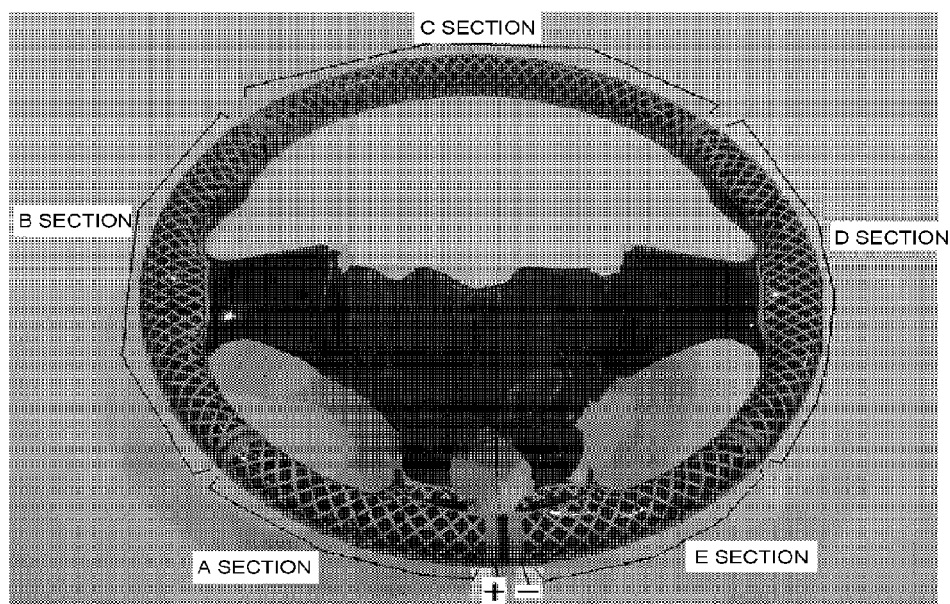
FIG. 15 is a photograph illustrating that a rim to which a plurality of molds are connected is divided in units of the molds.
Figure 16:
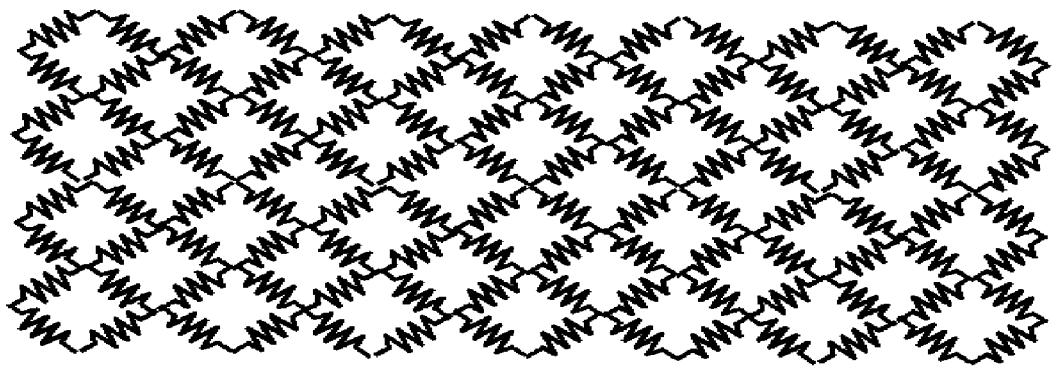
FIG. 16 is a diagram illustrating the heating element having a lattice shape of FIG. 7 as an electrical circuit.
Figure 17:
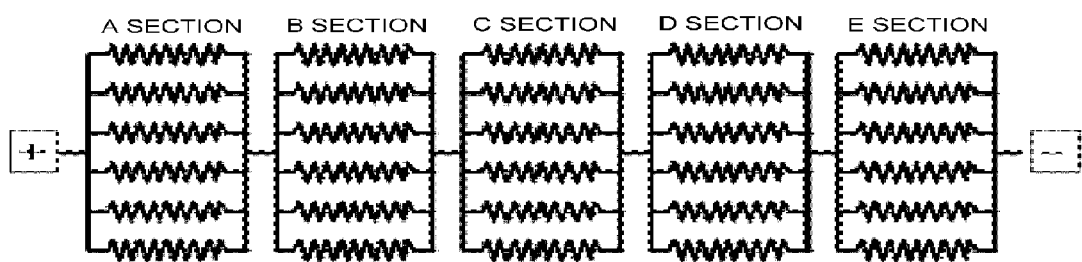
FIG. 17 is a diagram illustrating the heating element of FIG. 15 in an A section, a B section, a C section, a D section, and an E section.

FIG. 16 is a diagram illustrating the heating element 200 having a lattice shape of FIG. 7, in which each section acts as a resistor. FIG. 17 is a diagram illustrating heating lines of the heating element 200 of FIG. 15 as electrical circuits in an A section, a B section, a C section, a D section, and an E section. The A, B, C, D, and E sections are connected to one another in series, and the heating lines of the heating element 200 in each of the A, B, C, D, and E sections are connected to one another in parallel.

In the present embodiment, with regard to the steering wheel 100 including a boss 110, a spoke 120, and the rim 130, the heating element 200 is coated on the rim 130 which is mainly held by a driver while driving the vehicle.

Referring to FIG. 7 and FIG. 8, the heating element 200 is coated as an electrically conductive paste on a surface of the rim 130.

The heating element 200 is formed such that the heating lines of the heating element 200 are electrically connected in parallel as shown in FIGS. 16 and 17, and an electrical resistance per unit area decreases away from an inner diameter portion of the rim 130 toward an outer diameter portion of the rim 130.

In this case, since a heating temperature of the heating element 200 increases away from the inner diameter portion toward the outer diameter portion that has a circumferential length greater than that of the inner diameter portion, the rim 130 is heated to a uniform temperature.

FIGS. 11 through 14 are schematic views illustrating various patterns of the heating element 200 employed in the present embodiment.

The heating element 200 includes a plurality of first heating lines 201 which are coated from the inner diameter portion to the outer diameter portion of the rim 130, and a plurality of second heating lines 202 which are coated from the inner diameter portion to the outer diameter portion of the rim 130 across the first heating lines 201. The first heating lines 201 and the second heating lines 202 are coated such that an electrical resistance per unit area decreases away from the inner diameter portion toward the outer diameter portion of the rim 130. That is, since the electrical resistance decreases toward the outer diameter portion, a heating temperature increases toward the outer diameter portion that has a circumferential length greater than that of the inner diameter portion, thereby enabling heat to be generated at a uniform temperature between the inner diameter portion and the outer diameter portion.

Also, the first heating lines 201 and the second heating lines 202 are coated such that a coating thickness of a conductive paste increases away from the inner diameter portion toward the outer diameter portion of the rim 130. In this case, since an electrical resistance per unit area decreases toward the outer diameter portion, a heating temperature increases toward the outer diameter portion that has a circumferential length greater than that of the inner diameter portion, thereby enabling heat to be generated at a uniform temperature between the inner diameter portion and the outer diameter portion.

Also, the first heating lines 201 and the second heating lines 202 are formed such that a coating width of a conductive paste increases away from the inner diameter portion toward the outer diameter portion of the rim 130. In this case, since an electrical resistance per unit area decreases toward the outer diameter portion, a heating temperature increases toward the outer diameter portion that has a circumferential length greater than that of the inner diameter portion, thereby enabling heat to be generated at a uniform temperature between the inner diameter portion and the outer diameter portion.

Figure 12:
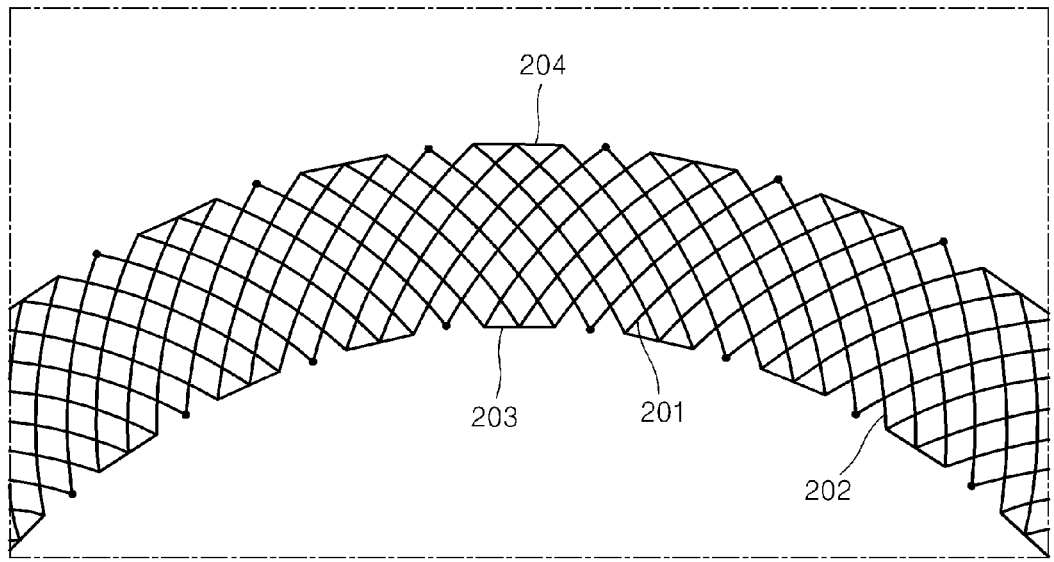
Figure 13:
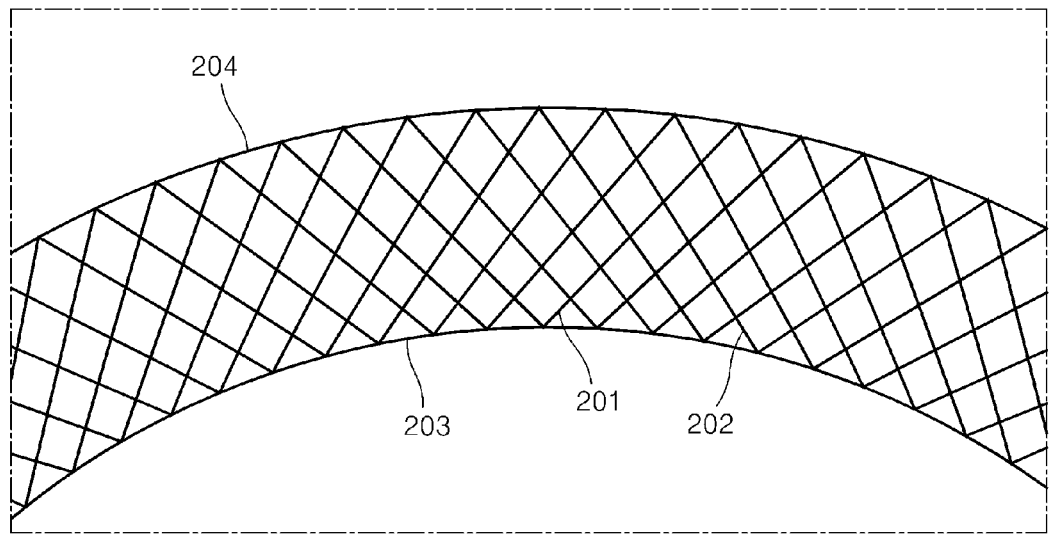
Figure 14:
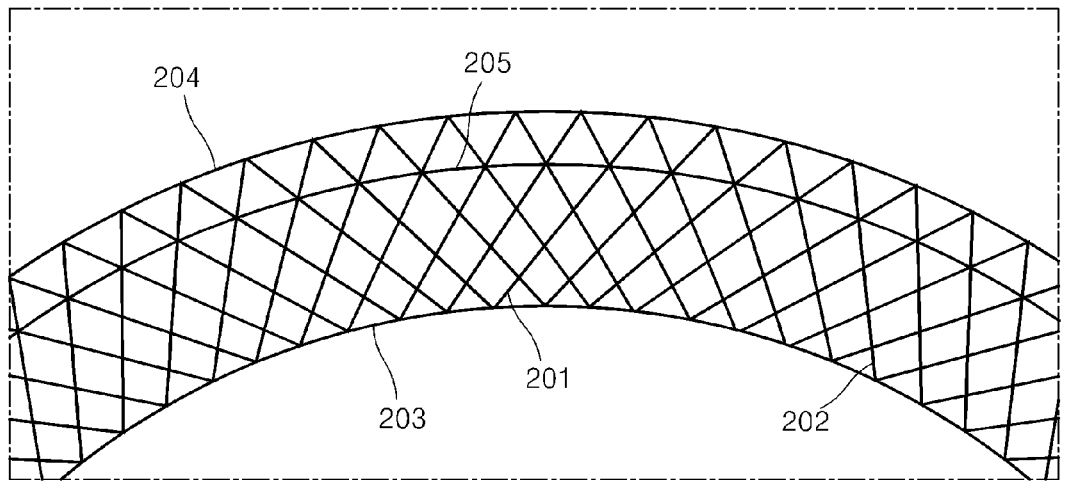

Also, as shown in FIGS. 12 through 14, third heating line 203 for connecting the first heating lines 201 and the second heating lines 202 is further coated on the inner diameter portion of the rim 130, and fourth heating line 204 for connecting the first heating lines 201 and the second heating lines 202 is further coated on the outer diameter portion of the rim 130.

The heating element 200 is coated on a top portion and a bottom portion of the rim 130. In this case, the first and second heating lines 201 and 202 may be smoothly electrically connected to each other by the third and fourth heating lines 203 and 204.

Also, as shown in FIG. 14, fifth heating line 205 is further coated in parallel to the fourth heating line 204 between the top portion of the rim 130 and the fourth heating line 204. In this case, since more heat is generated in the outer diameter portion than in the inner diameter portion that has a smaller surface area than the outer diameter portion, heat is generated at a uniform temperature.

Meanwhile, in order to improve the appearance of the steering wheel 100, as shown in FIG. 9, the rim 130 is divided into a portion where a decoration pattern layer 410 on which a wood pattern is formed is transferred and another portion where a leather 450 is covered. That is, as shown in FIGS. 8 and 9, the rim 130 includes a first mold 131 to which the decoration pattern layer 410 is transferred and a second mold 132 where the leather 450 is covered, a groove portion 133 is formed between the first and second molds 131 and 132, the leather 450 is wound around the second mold 132, and finishing of the leather 450 may be performed in the groove portion 133.

As described above, since the groove portion 133 is formed between the first mold 131 and the second mold 132, it is difficult to electrically connect the first through fifth heating lines 201 through 205 coated on an outer circumferential surface of the first mold 131 and the first through fifth heating lines 201 through 205 coated on an outer circumferential surface of the second mold 132 of the rim 130.

Accordingly, the first through fifth heating lines 201 through 205 are connected by forming (that is, by entirely coating) a connection portion 220 in the groove portion 133.

Figure 10A:
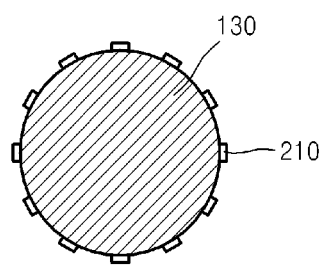
FIGS. 10A through 10D are schematic views for explaining a process of forming a transfer pattern layer on a surface of the steering wheel on which the heating element is coated.
Figure 10B:
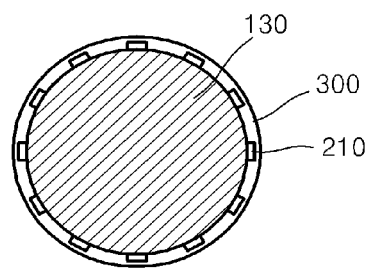
Figure 10C:
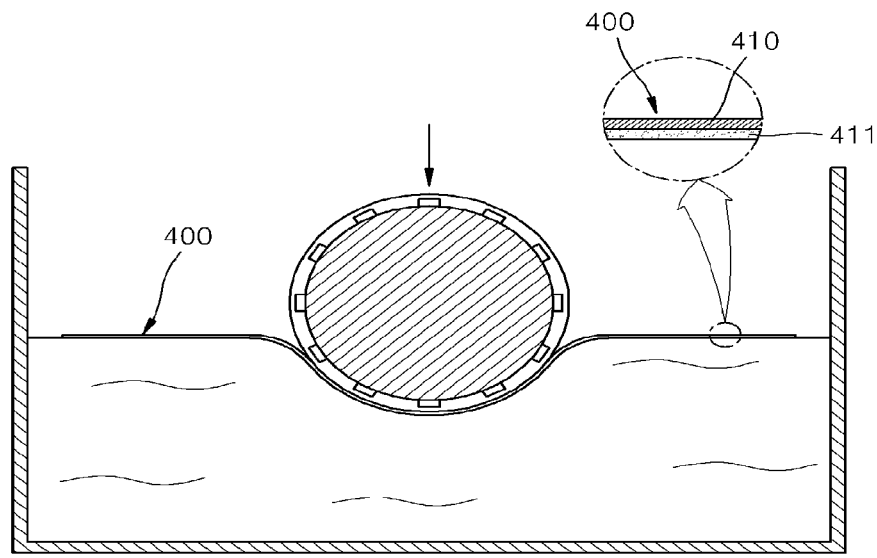
Figure 10D:
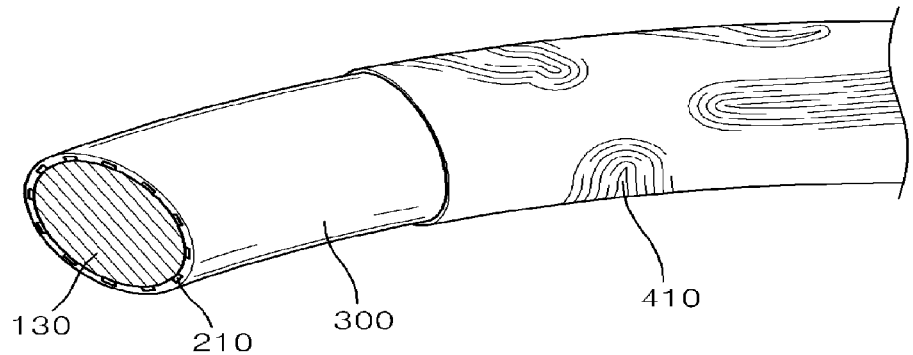
Figure 11:
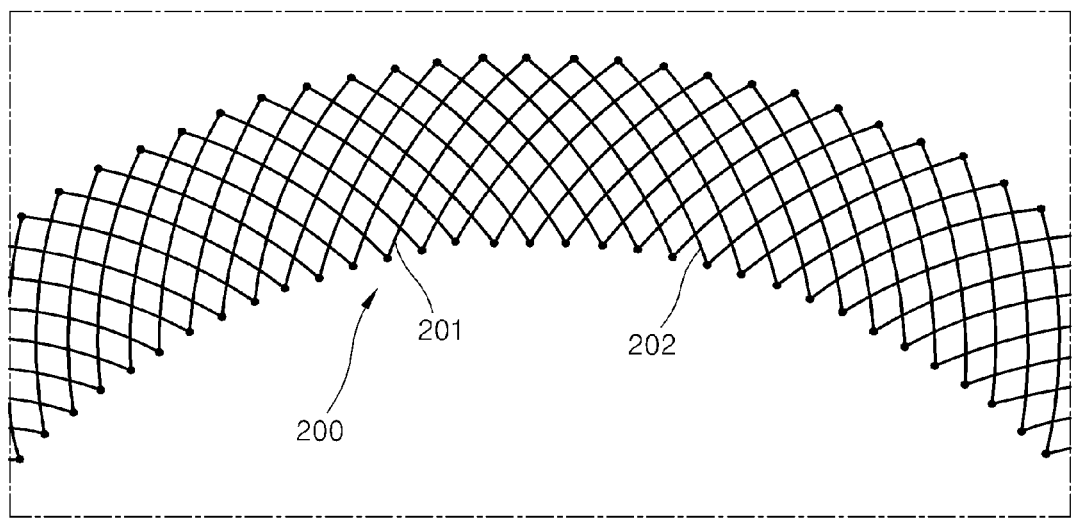
FIGS. 11 through 14 are schematic views illustrating various patterns of the heating element.

Meanwhile, the decoration pattern layer 410 is formed by transferring a transfer film 400 on which a decoration pattern is printed onto a surface of the heating element 200. Referring to FIG. 10C, the transfer film 400 includes the decoration pattern layer 410 on which a pattern such as a wood pattern is printed and a poly vinyl alcohol (PVA) layer 411. The decoration pattern layer 410 is activated by using an activator such as a thinner on a top surface of the transfer film 400 that is floated on a surface of water during a transfer operation, and then the rim 130 is soaked below the surface of the water, so that the decoration pattern layer 410 is transferred to the surface of the rim 130 due to water pressure.

In this case, due to the groove portion 133 between the first through fifth heating lines 201 through 205, a three-dimensional effect of the decoration pattern may be achieved and slipperiness along the rim 130 may be prevented.

Also, as shown in FIGS. 10A through 10D, a base layer 300 having a color different from that of the decoration pattern of the decoration pattern layer 410 is further formed between the heating element 200 and the decoration pattern layer 410. The base layer 300 emphasizes the appearance of the decoration pattern by including a paint having a color that is different from that of the decoration pattern of the decoration pattern layer 410.

Also, since the base layer 300 fills the groove portion 133 formed between the heating lines 201 through 205, the decoration pattern layer 410 may be more smoothly transferred to the rim 130.

In the steering wheel 100 described above, since the heating element 200 coated on the surface of the rim 130 includes the first through fifth heating lines 201 through 205, even though one of the first through fifth heating lines 201 through 205 is electrically disconnected, heat may be continuously generated from the remaining heating lines.

Also, in the rim 130 in which the groove portion 133 is formed between the first mold 131 and the second mold 132, since the connection portion 220 of the heating element 200 is formed in the groove portion 133 and around the groove portion 133, the first through fifth heating lines 201 through 205 coated on the outer circumferential surface of the first mold 131 and the first through fifth heating lines 201 through 205 coated on the outer circumferential surface of the second mold 132 may be easily electrically connected to each other through the connection portion 220.

As described above, according to the steering wheel of the present invention, since a conductive paste is coated as a heating element and an electrical resistance decreases away from an inner diameter portion of a rim toward an outer diameter portion of the rim, the rim may be entirely heated to a uniform temperature and a driver may hold the rim without any temperature discomfort.

Since the heating element is employed in the steering wheel of a vehicle, the driver may safely hold the warm rim in winter, thereby safely driving the vehicle. Even though a portion of the heating element is short-circuited, heat may be continuously generated from other portions. Also, although an aesthetic decoration pattern such as a wood pattern is adopted, since a diameter of the steering wheel is small, convenience of use may be improved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A steering wheel, comprising:
   a rim and
   a heating element disposed over the rim, the heating element comprising:
   a plurality of heating lines, and
   an electrically conductive paste coated over the plurality of heating lines, wherein a thickness of the electrically conductive paste is configured to change from an inner portion of the rim towards an outer portion of the rim based on a resistive characteristic of the heating element.

2. The steering wheel of claim 1, wherein the heating element is configured to have an electrical resistance per unit area that increases away from the inner portion toward the outer portion of the rim if the plurality of heating lines of the heating element are electrically connected in series.

3. The steering wheel of claim 1, wherein the heating element is configured to have an electrical resistance per unit area that decreases away from the inner portion toward the outer portion of the rim if the heating lines of the heating element are electrically connected in parallel.

4. The steering wheel of claim 1, wherein the plurality of heating lines comprises a plurality of first heating lines and a plurality of second heating lines such that the plurality of first heating lines cross the plurality of second heating lines.

5. The steering wheel of claim 4, wherein the first heating lines and the second heating lines are coated with the electrically conductive paste such that an electrical resistance per unit area decreases away from the inner diameter portion toward the outer diameter portion of the rim.

6. The steering wheel of claim 4, wherein the first heating lines and the second heating lines are coated with the electrically conductive paste such that a coating thickness of the electrically conductive paste increases away from the inner diameter portion toward the outer diameter portion of the rim.

7. The steering wheel of claim 4, wherein the first heating lines and the second heating lines are coated with the electrically conductive paste such that a coating width of the electrically conductive paste increases away from the inner diameter portion toward the outer diameter portion of the rim.

8. The steering wheel of claim 4, the heating element further comprising:
   a third heating line configured on the inner diameter portion of the rim to connect the first heating lines and the second heating lines, and
   a fourth heating line further configured on the outer diameter portion to connect the first heating lines and the second heating lines.

9. The steering wheel of claim 8, the heating element further comprising a fifth heating line configured in parallel to the fourth heating line between a top portion of the rim and the fourth heating line.

10. The steering wheel of claim 4, further comprising a decoration pattern layer formed by transferring a transfer film, on which a decoration pattern is printed, onto a surface of the heating element.

11. The steering wheel of claim 10, further comprising a base layer formed between the heating element and the decoration pattern layer.

12. A method for heating a steering wheel, comprising:
depositing a plurality of heating lines on a rim of the steering wheel;
coating the plurality of heating lines on the rim with an electrically conductive paste such that a thickness of the electrically conductive paste changes from an inner portion of the rim towards an outer portion of the rim based on a resistive characteristic of the heating lines, and
supplying power to the plurality of heating lines.

13. The method of claim 12, wherein the plurality of heating lines have an electrical resistance per unit area that increases away from the inner portion toward the outer portion of the rim if the plurality of heating lines of the heating element are electrically connected in series.

14. The method of claim 12, wherein the plurality of heating lines have an electrical resistance per unit area that decreases away from the inner portion toward the outer portion of the rim if the heating lines of the heating element are electrically connected in parallel.

15. The method of claim 12, wherein depositing the plurality of heating lines comprises depositing a plurality of first heating lines and a plurality of second heating lines, such that the plurality of first heating lines cross the plurality of second heating lines.

16. The method of claim 15, wherein coating the plurality of heating lines comprises coating the plurality of first heating lines and the plurality of second heating lines such that a coating thickness of the electrically conductive paste increases away from the inner diameter portion toward the outer diameter portion of the rim.

17. The method of claim 15, wherein coating the plurality of heating lines comprises coating the plurality of first heating lines and the plurality of second heating lines such that a coating width of the electrically conductive paste increases away from the inner diameter portion toward the outer diameter portion of the rim.

18. The method of claim 15, wherein depositing the plurality of heating lines further comprises:
depositing a third heating line on the inner diameter portion of the rim to connect the first heating lines and the second heating lines, and
depositing a fourth heating line on the outer diameter portion to connect the first heating lines and the second heating lines.

19. The method of claim 12, further comprising:
depositing a decoration pattern layer by transferring a transfer film, on which a decoration pattern is printed, onto a surface of the plurality of heating lines.

20. The method of claim 19, further comprising:
depositing a base layer between the heating element and the decoration pattern layer.

* * * * *